United States Patent Office 3,513,118
Patented May 19, 1970

3,513,118
VINYL URETHANE COATING
Norris R. Legue, Scotch Plains, N.J., and Arthur Ehrlich, Brooklyn, N.Y., assignors to The Baker Castor Oil Company, Bayonne, N.J., a corporation of New Jersey
No Drawing. Filed Apr. 19, 1967, Ser. No. 631,954
Int. Cl. C09d 3/76
U.S. Cl. 260—23
21 Claims

ABSTRACT OF THE DISCLOSURE

A composition which comprises (1) a partially hydrolyzed vinyl chloride-vinyl acetate copolymer (2) at least one polyhydric alcohol having an equivalent weight between about 38 and 600 and a functionality between 2 and 6, and (3) a urethane prepolymer derived from the reaction of a polyisocyanate and a polyfunctional compound containing active hydrogen groups; this composition demonstrates excellent performance as a coating when applied to a wood substrate.

BACKGROUND OF THE INVENTION

Field of the Invention

This invention relates to a vinyl urethane composition for coating a wood substrate and a wood substrate coated with a vinyl-urethane composition.

Brief Description of the Prior Art

There are today available commercially many different types of coatings for wood substrates whose application is restricted by one or more deficiencies in their overall performance. This difficulty in developing a coating for a wood substrate e.g. bare wood, is in large part due to the fact that wood is a complex substrate with which there are associated numerous problems. For example, no two pieces of wood are exactly the same. Temperature, humidity, sun, and other climatic conditions affect both the physical and chemical properties of wood during its growth period. The section of the tree that grows during the summer is far different from the section that grows in the spring. The grain (alternating bands of dark and light wood) is also highly variable. These factors contribute to the dimensional instability and variability of the wood, particularly when the wood is water soaked and dried, which in turn tends to adversely affect the performance of the finish.

There are at least three major requirements that a coating must meet to be considered acceptable for factory finishing and subsequent marketing. (1) The coating must withstand dimensional changes of the wood. It should be understood that a coating applied to wood does not prevent the dimensional changes of wood from taking place, rather it adjusts to them. For a coating to perform well on such an unstable substrate as wood, it must have outstanding adhesion, cohesion and excellent flexibility so that it can expand and contract with the wood substrate. It must also be able to bridge cracks that develope in the wood without tearing and it must have outstanding water resistance to withstand immersion in boiling water, ambient temperature water, and ice, for long periods; (2) Whether serving as a self-priming top-coat or as a primer, a coating must have both excellent initial and ageing properties to withstand weathering for many years. For self priming topcoats, excellent adhesion, cohesion, flexibility tear strength, water resistance, lack of gradual embrittlement, and resistance to the effects of sunlight are essential. With primers, resistance to sunlight is less necessary. However, inter-coat adhesion between primer and topcoat is mandatory; and (3) In order to maintain mill capacity and retain its economic advantage, a finish must be suitable for production-line finishing. Application and curing within a few minutes are essential.

The application of the commonly available coatings such as epoxies, vinyls and resin-drying oil combinations to unstable wood substrates has been restricted by one or more deficiencies in their overall performance. Epoxy coatings have excellent adhesion but poor flexibility, elongation and relatively poor exterior durability, whereas vinyl coatings have good exterior durability but poor adhesion and cannot withstand dimensional changes. Resin-drying oil combinations such as alkyds, epoxy esters, oleoresinous varnishes and urethane alkyds don't have a high degree of blister resistance, durability, water resistance, and do not withstand dimensional changes.

Accordingly, one aspect of the present invention is to provide compositions that give satisfactory overall performance when coated on a wood substrate.

Another aspect of the present invention is to provide a coating composition which comprises (a) a partially hydrolyzed vinyl chloride-vinyl acetate copolymer (b) at least one polyhydric alcohol having an equivalent weight between about 38 and 600 and a functionality between 2 and 6, and (3) a urethane prepolymer composition.

Still another aspect of the present invention is to provide a composition for coating directly on bare wood which has outstanding adhesion, cohesion, and excellent flexibility with regard to expansion and contraction of the wood substrate and successfully passes all three water immersion tests designed by the American Plywood Association which reproduce the dimensional changes that can be anticipated after many years of exterior exposure which composition comprises (a) a partially hydrolyzed vinyl chloride-vinyl acetate copolymer, (b) at least one polyalkylene glycol having a molecular weight between about 134 and 1000 and (c) a urethane prepolymer composition.

The foregoing aspects of this invention as well as others will be apparent as the description proceeds.

The compositions of this invention, comprise (1) a mixture of a partially hydrolyzed vinyl chloride-vinyl acetate copolymer (2) at least one polyhydric alcohol having an equivalent weight between about 38 and 600 and a functionality between 2 and 6, and (3) a urethane prepolymer derived from the reaction of a polyisocyanate and a polyfunctional compound containing active hydrogens. These compositions provide excellent coatings for wood substrates in that they exhibit good all around performance as regards adhesion, cohesion, flexibility, ageing properties, tear strength, water resistance, lack of gradual embrittlement, resistance to sunlight and rapid dry for easy application.

The partially hydrolyzed vinyl chloride-vinyl acetate copolymers which are used in the compositions of this invention are ones wherein the degree of hydrolysis is such that the copolymer contains by weight from about 70 to about 96.5 percent vinyl chloride; from about 2 to about 20 percent vinyl alcohol and from about 1.5 to about 25 percent vinyl acetate, combined therein. A particularly preferred partially hydrolyzed vinyl chloride-vinyl acetate copolymer is one wherein there is present about 91 percent by weight vinyl chloride, about 3 percent by weight vinyl acetate, and about 6 percent by weight of vinyl alcohol, combined in the copolymer.

For a more detailed explanation of the partially hydrolyzed vinyl chloride-vinyl acetate copolymers suitable for combining with polyurethane resins reference should be had to U.S. Pat. No. 2,512,726, the disclosure of which is incorporated herein by reference.

The urethane prepolymers are produced by reaction of a polyisocyanate with a polyfunctional compound having active hydrogens in accordance with methods well known to those skilled in the art. The urethane prepolymer may be prepared either in the presence or absence of an inert solvent. Illustrative of suitable solvents are aromatic hydrocarbons such as toluene and xylene. Solvents having active hydrogen atoms should be avoided since these solvents will react with the polyisocyanate.

Both aromatic and aliphatic diisocyanates can be used to react with the polyfunctional compound containing active hydrogens. The preferred polyisocyanate is tolylene diisocyanate (2,4/2,6). Illustrative of other suitable polyisocyanates are the following: m-phenylene diisocyanate, xenylene 4,4'-diisocyanate, naphthalene 1,5'-diisocyanate, 3,3'-bitolylene 4,4'-diisocyanate, diphenyl methane 4,4'-diisocyanate, 1-chlorophenylene 2,4-diisocyanate, 1-dianisidine diisocyanate, diphenylene 4,4'-diisocyanate, hexamethylene diisocyanate, cyclohexylene 1,2-diisocyanate, 3,3'-dimethoxy 4,4'-biphenylene diisocyanate and tetramethylene diisocyanate.

The polyfunctional compound reacted with the polyisocyanate to obtain the prepolymer is preferably castor oil, a castor oil derived polyol or mixtures thereof. The preferred grade of castor oil is a low acid, low volatile grade avaiable commercially as "DB" castor oil obtained from The Baker Castor Oil Company. Suitable castor oil derived polyols are glycol and/or polyglycol esters of ricinoleic acid as well as esters obtained from the reaction of a polyhydric alcohol containing at least three hydroxyl groups with ricinoleic acid. Illustrative of castor oil derived polyols that may be used to obtain the urethane prepolymer are the following: propylene glycol monoricinoleate, glycerol monoricinoleate, ethylene glycol monoricinoleate, polyethylene glycol monoricinoleate dipropylene glycol monoricinoleate, pentaerythritol monoricinoleate, etc.

The urethane prepolymers may be prepared by mixing the desired polyisocyanate and castor oil or castor oil derived polyol at 50° C. for one hour in a nitrogen atmosphere. However, other temperatures ranging from about 20° C. to 100° C. may be satisfactorily employed. These urethane prepolymers used in this invention have an NCO/OH ratio of greater than 1.3:1 and preferably the urethane prepolymer contains from about 30 to about 45 parts by weight of a polyisocyanate, e.g. tolylene diisocyanate and from about 70 to about 55 parts by weight of castor oil, or a castor oil derived polyol.

The polyhydric alcohols used in the compositions of this invention have an equivalent weight between about 38 and 600 and have a functionality between 2 and 6. Illustrative of suitable materials are at least one of the following: (a) polyalkylene glycols represented by the formula HO(RO)$_n$H wherein R stands for an alkylene radical such as methylene, ethylene, propylene, etc., and $n$ is an integer greater than 1. Representative examples are polypropylene glycol, dipropylene glycol, polyethylene glycol and other polyalkylene glycol having a molecular weight between 134 and 1000, (b) lower alkylene glycols such as propylene glycol, butylene glycol, etc.; (c) castor oil (d) the product derived from the reaction of about 86 to about 96 parts by weight castor oil with about 4 to about 14 parts by tolylene diisocyanate. This product is an oil, not a urethane prepolymer because there are no reactive isocyanate groups (see U.S. Pat. 3,262,952 for a detailed description on the preparation of these materials), (e) polyether derivatives of a polyhydric alcohol such as polyoxypropylene glycerol which has a functionality of 3, polyoxypropylene pentaerythritol which has a functionality of 4, polyoxypropylene sorbitol which has a functionality of 6, etc.; (f) glycol, polyglycol or polyhydric alcohol esters (at least three hydroxyls per molecule) of hydroxycarboxylic acids having twelve to twenty-two carbon atoms. These esters may be prepared by reacting the desired hydroxy carboxylic acid with dihydric lower aliphatic alcohol, ether alcohol or polyhydric alcohol containing at least three hydroxyls. Illustrative of these compounds are propylene glycol monoricinoleate, ethylene glycol monoricinoleate, propylene 12-hydroxy stearate, diethylene glycol monoricinoleate, polypropylene glycol 12-hydroxy stearate, propylene glycol hydroxy palmitate, polyethylene glycol monoricinoleate, pentaerythritol monoricinoleate, sorbitol monoricinoleate, erythritol monoricinoleate, pentaerythritol 12-hydroxy stearate, cellulose hydroxy stearate, pentaerythritol diricinoleate, etc.

The preferred polyhydric alcohols are the polyalkylene glycols heretofore described. The use of a polyalkylene glycol in the compositions of this invention result in a coating having excellent overall performance on a bare wood substrate.

Generally, it has been found that the ratio of partially hydrolyzed vinyl chloride-vinyl acetate copolymer to urethane prepolymer should be from about 0.8 to about 4.0 parts by weight of partially hydrolyzed vinyl chloride copolymer to one part by weight of urethane prepolymer. The polyhydric alcohol component in the composition having a functionality between 2 and 6 is present in the composition in amount from about 0.2 to about 3.5 parts by weight per one part by weight of urethane prepolymer. Generally, best results are obtained when the urethane prepolymer comprises less than about 35 percent by weight of the total composition (based on the combined weight of the three components heretofore described). The compositions of this invention having an NCO/OH ratio of less than 1:1 and preferably from 0.25 to .70:1, demonstrate the best overall performance on a bare wood substrate.

The coating composition of this invention may be air dried, forced dried or baked. Usually composition becomes tack free as soon as the highly volatile solvents evaporate. Actual curing is dependent on time and temperature. The curing process may be carried out at temperatures ranging from about 10° C. to about 205° C. with the curing rate being accelerated by increasing the temperature. It should be noted that the upper temperature limitation on cure may be more dependent on the ability of wood substrate to withstand heat than the coating composition itself.

If it is desired to cure at room temperature, it may be expedient to add a catalyst to speed up the reaction. Organotin catalysts greatly accelerate the cure rate of vinyl urethanes.

As will be understood by those of ordinary skill in this art, the composition of this invention may be applied to a wood substrate as a pigmented coating having excellent overall exterior performance. For example, rutile titanium dioxide is a small particle size pigment that may be included in the composition where excellent hiding power and good brightness are desired. This pigment is highly resistant to chalking and fading on exterior exposure. Antimony oxide may be used to reduce chalking, improve suspension properties (when used in conjunction with titanium dioxide) and contributes fire resistant properties.

The following examples are illustrative of the coating compositions of this invention.

Example 1

| Vinyl copolymer: | Parts by weight |
| --- | --- |
| Partially hydrolyzed vinyl chloride-vinyl acetate copolymer resin[1] in solution (20% non-volatile) | 218 |
| Polyol composition: | |
| Polypropylene glycol (M.W. 400–450) | 26.2 |
| Urethane prepolymer: | |
| 122 parts by weight of castor oil reacted with 100 parts by weight of tolylene diisocyanate | 19.3 |

[1] Solid resin is comprised of vinyl chloride 91%, vinyl acetate 3%, vinyl alcohol 6%.

The 20% non-volatile partially hydrolyzed vinyl chloride-vinyl acetate copolymer solution was prepared by dissolving this material in a 1:1 mixture by weight of methyl isobutyl ketone/toluene in a ratio of 1 part by weight of vinyl copolymer to 4 parts by weight of the solvent mixture.

The urethane prepolymer was prepared by reacting the tolylene diisocyanate and castor oil in nitrogen atmosphere at 60° C.

The coating composition is prepared by mixing the 20% non-volatile resin solution with the polypropylene glycol until a homogeneous mixture is obtained and adding to the mixture the urethane prepolymer while thoroughly stirring.

Example 2

| Vinyl copolymer: | Parts by weight |
| --- | --- |
| Partially hydrolyzed vinyl chloride-vinyl acetate copolymer resin in solution (same as in Example 1) | 300 |
| Polyol composition: | |
| Polypropylene glycol (M.W. 400–450) Reaction product of 95.6% by weight castor oil and 4.4% by weight tolylene diisocyanate | 20.7 |
| Urethane prepolymer composition: | |
| 223 parts by weight of castor oil reacted with 100 parts by weight of tolylene diisocyanate | 19.3 |

The vinyl copolymer solution was prepared as described in Example 1.

The polyol composition was prepared simply by mixing 35 parts by weight of the reaction product of 4.4% by weight tolylene diisocyanate and 95.6% by weight of castor oil with 65 parts by weight of polypropylene glycol.

The urethane prepolymer was prepared under the same conditions as described in Example 1.

The vinyl copolymer, polyol composition and urethane prepolymer composition were simply mixed as described in Example 1 to produce a coating composition.

Example 3

| Vinyl copolymer: | Parts by weight |
| --- | --- |
| Partially hydrolyzed vinyl chloride-vinyl acetate copolymer in solution (same as in Example 1) | 275 |
| Polyol composition: | |
| Polypropylene glycol (M.W. 400–450) Propylene glycol monoricinoleate | 15 |
| Urethan prepolymer composition: | |
| 100 parts by weight of tolylene diisocyanate reacted with 223 parts by weight of castor oil | 30 |

The vinyl copolymer solution was prepared as in Example 1.

The propylene glycol monoricinoleate was prepared by reacting 62.2 parts by weight of propylene glycol and 100 parts by weight of castor oil. These materials are reacted in the presence of an alkali catalyst (interesterification).

The polyol composition was obtained by simple blending of 75 parts by weight of polypropylene glycol and 25 parts by weight of propylene glycol monoricinoleate.

The urethane prepolymer was prepared under the same conditions as described in Example 1.

The vinyl copolymer solutions, polyol composition and urethane prepolymer composition were mixed as described in Example 1 to produce a coating composition.

Example 4

| Vinyl copolymer: | Parts by weight |
| --- | --- |
| Partially hydrolyzed vinyl chloride-vinyl acetate copolymer resin in solution (same as in Example 1) | 218 |
| Polyol composition: | |
| Pentaerythritol monoricinoleate | 26.2 |
| Urethane prepolymer composition: | |
| 100 parts by weight of tolylene diisocyanate reacted with 163 parts by weight of castor oil | 19.3 |

The vinyl copolymer solution was prepared as in Example 1.

The pentaerythritol monoricinoleate was obtained by reacting 100 parts by weight of castor oil fatty acids with 28.9 parts by weight of mono-pentaerythritol at elevated temperatures.

The urethane prepolymer was prepared under the same conditions as described in Example 1.

The coating composition was obtained in the same manner described in the previous examples.

Example 5

| Vinyl chloride: | Parts by weight |
| --- | --- |
| Partially hydrolyzed vinyl chloride-vinyl acetate copolymer resin in solution (same as in Example 1) | 218 |
| Polyol composition: | |
| Propylene glycol monoricinoleate | 26.2 |
| Urethane prepolymer composition: | |
| 100 parts of tolylene diisocyanate reacted with 122 parts of castor oil | 19.3 |

The vinyl copolymer solution was prepared as in Example 1.

The propylene glycol monoricinoleate was prepared as described in Example 3.

The urethane prepolymer was prepared in a manner as described in Example 1.

The coating composition was obtained in the same manner described in the previous examples.

Example 6

| Vinyl copolymer: | Parts by weight |
| --- | --- |
| Partially hydrolyzed vinyl chloride vinyl acetate copolymer (vinyl chloride 91%, vinyl acetate 3%, vinyl alcohol 6%) | 11.70 |
| Polyol composition: | |
| Same as in Example 3 | 5.62 |
| Urethane prepolymer composition: | |
| Same as in Example 5 | 4.15 |
| Other materials: | |
| Titanium dioxide (non-chalking-rutile) | 19.45 |
| Antimony oxide | 2.15 |
| Grinding aid ("Lexinol" AC-1) | 0.21 |
| Diglycidyl ether of Bisphenol A (ERL-2774) | 0.66 |
| Alkyd ("Duraplex" D-65A) | 0.09 |
| Silicone ("Dri-Film 103") | 0.01 |
| Methyl isobutyl ketone | 27.98 |
| Toluene | 27.98 |

This pigmented vinyl urethan coating was prepared as follows: The partially hydrolyzed vinyl chloride-vinyl acetate copolymer, alkyd, silicone and diglycidyl ether of Bisphenol A are dissolved in the solvent system of methyl isobutyl ketone and toluene. After dissolving in these solvents 12 parts by weight of this solution are placed in a pebble mill together with the pigments and grinding aid and ground to a fineness greater than 5. It is important that the pigment be ground in the vinyl solution rather than in the polyol composition. Thereafter the grind is reduced by adding to the pebble mill the remaining solution from which the 12 parts by weight were taken, after which the polyol composition is added.

The homogeneous composition is removed from the pebble mill and thoroughly mixed with the urethane prepolymer composition at room temperature.

A pigmented composition as exemplified by the formulation of Example 6 is an excellent finish for overall performance which has successfully passed all three water immersion tests designed by the American Plywood Association. These tests are conducted on exterior type plywood panels (3/8" thick, 3 ply) coated on one side only and with no edge or back sealing which are subjected to three cyclical water soak tests as follows:

(1) Soak Test: Two 3" x 6" panels are subjected to 25 cycles of eight hours immersion in ambient temperature water followed by drying 16 hours in an oven at 145° F.

(2) Boil Test: Two 3" x 6" panels are subjected to 25 cycles of four hours immersion in boiling water followed by drying 20 hours in an oven at 145° F.

(3) Freeze Test: Two 4" x 6" panels are subjected to 10 cycles of eight hours immersion in ambient temperature water, followed by 16 hours freezing at 0° F. or lower, followed by 24 hours drying in an oven at 145° F.

After being subjected to this test, a coating should have no extensive loss of adhesion, no blisters and any coating ruptures must be no more than 6 inches of cumulative measurement. There should be no extensive chalking, discoloration or overall appearance degradation.

Of the three water immersion tests, the boiling water test is by far the most severe. An uncoated piece of wood that has been subjected to this test is usually severely warped and cracked. The length of the cracks sometimes run from 4 to 6 inches, the crack widths sometimes mounting to greater than ⅛ or ¼ inch and in some cases, the wood on one side of the crack is often raised higher than the wood on the other side of the crack.

The pigmented composition of Example 6 was dissolved in a convenient amount of a 50–50 mixture in parts by weight of methyl isobutyl ketone and toluene to obtain a composition of sprayable viscosity.

Six wood panels (four 3" x 6" panels and two 4" x 6" panels) were spray coated to a film thickness of about 8–10 mils with the pigmented composition of Example 6 and then subjected to the water immersion tests designed by American Plywood Association in accordance with the procedure heretofore described for these tests. The results are reported in Table 1.

wood. On extremely poor wood, that is to say, one with very wide bands and containing the major percentage of dark wood, a film thickness above 5 mils is necessary in order to pass the 25 cycles of the American Plywood Association boiling water test. Weathering tests also indicate that 5 mil thickness on sanded plywood and 3½ mils on overlaid plywood is quite satisfactory. For more dimensionally stable substrates such as overlaid plywood and hardboard film, thicknesses of about 2 mils are satisfactory for the water soak tests. However, for long term weathering, 3½ mils or greater gives best results.

The coating compositions of this invention are applied in accordance with techniques well known to those of skill in the art such as with a spray gun, roller or curtain coater, etc.

Modifications of the composition given in Example 6 may be carried out to improve a specific property necessary for certain applications. For example, a wide variety of ketone and secondary solvents can be used to change drying properties, viscosity, pot life and the like. Thus replacing all or part of the methyl isobutyl ketone and/or toluene in Example 6 with methyl ethyl ketone will reduce tack free time, increase pot life, and lower solution viscosity. The pigment volume concentration can be changed while keeping the titanium dioxide to antimony oxide constant. An increase in the pigment volume concentration in the coating composition of Example 6 which for that example is 21.3% results in improvement in surface dry time, block resistance, and hiding power. Flexibility, chalk resistance and performance in water soak tests degrade. However, these changes are not very great when the pigment volume concentration is kept

| Substrate | Boil Test | Soak Test | Freeze Test | Results |
|---|---|---|---|---|
| DFPA Sanded Plywood (Grade B–C) or better (3" x 6" panel). | 25 cycles of 4 hours total immersion followed by 20 hours dry in an oven at 145° F. | | | No loss of adhesion. No blisters No film rupture. |
| DFPA Medium Density Overlaid Plywood (3" x 6" panel). | do | | | Do. |
| DFPA Sanded Plywood (Grade B–C) or better (3" x 6" panel). | | 25 cycles of 8 hours total immersion in ambient temperature water followed by 16 hours in an oven at 145° F. | | Do. |
| DFPA Medium Density Overlaid Plywood (3" x 6" panel). | | do | | Do. |
| DFPA Sanded Plywood (Grade B–C) or better (4" x 6" panel). | | | 10 cycles of 8 hours total immersion in ambient temperature water followed by 16 hours at 0° F., followed by 24 by 24 hours in an oven at 145° F. | Do. |
| DFPA Medium Density Overlaid Plywood (4" x 6" panel). | | | do | Do. |

Thus, the coating composition of Example 6 and other compositions of this invention meet all the above listed water soak tests specified for both DFPA trademark Grade B–C (or better) Exterior Plywood and DFPA trademark Medium Density Overlaid Plywood. In addition this composition has other outstanding advantages including that it is a total finish (self priming topcoat). Most conventional coatings with good weathering properties require a primer for adhesion. Conversely, conventional primers require the protection of topcoats to prevent rapid weather degradation. In addition to the obvious advantages associated with using one system instead of two, longer weathering can be expected from a self priming topcoat. The entire film has good weathering properties, whereas the same film thickness for a primer plus a different topcoat system, only the topcoat has good weathering characteristics. Furthermore, exposure tests show that the coating compositions of this invention can also serve as an excellent primer per se for solution vinyl, alkyd, acrylic latex, vinyl acetate latex and oil base topcoats.

Tests on films as varying thickness obtained from the composition of Example 6 indicate that the performance of the pigmented coating depends heavily on film thickness. Generally, 5 mils is satisfactory on sanded ply-below 45%. This is particularly true on dimensionally stable substrates such as overlaid plywood and hardboard.

Decreasing the pigment volume concentration gives much better flexibility and performance in the water soak tests. However, if the pigment volume concentration is decreased to any great extent e.g. below 15%, a topcoat may be needed to protect the vinyl-urethane vehicle from ultraviolet light degradation when used on an exterior finish.

Increasing or decreasing the quantity of one or more of the vehicle components (partially hydrolyzed vinyl chloride-vinyl acetate copolymer, urethane prepolymer composition, and polyol composition) will modify the properties of the coating composition. For example, if the urethane prepolymer in Example 6 is increased by three parts by weight and the polyol composition decreased by three parts by weight more thermosetting properties can be expected. The coating will cure faster and harder while flexibility and pot life will degrade. Flexibility is also degraded by replacing the polyol composition present in Example 6 with the polyol composition in Example 4. Therefore, this composition is more suitable for use on dimensionally stable substrates such as overlaid plywood and hardboard than it is for bare plywood where high flexibility is necessary in order to withstand extreme dimensional changes. Some of the other compositions within the scope of this invention also do not demonstrate the same overall performance on bare plywood as the composition of Example 6 but are satisfactory for application on dimensionally stable wood substrates used for interior purposes.

It is also frequently useful to add other ingredients to the coating compositions of this invention to change the physical properties and/or reduce cost. For example, the raw material cost of vinyl urethanes is reduced by using extender pigments. In primers, the addition of barytes reduces cost without adversely affecting adhesion and performance in the American Plywood Association water soak tests.

While the examples cited herein are but exemplary of the invention, it is to be understood that other modifications are within the skill of those expert in this art and accordingly the scope of protection to be afforded is to be measured in accordance with the appended claims.

What is claimed:

1. A composition which consists essentially of (1) a partially hydrolyzed vinyl chloride-vinyl acetate copolymer, (2) a urethane prepolymer obtained from the reaction of about 30 to about 45 parts by weight of at least one diisocyanate with about 70 to about 55 parts by weight of a polyfunctional compound selected from the class consisting of a castor oil, a glycol ester of ricinoleic acid, a polyglycol ester of ricinoleic acid and a polyhydric alcohol ester of ricinoleic acid, said alcohol having at least three hydroxyl groups per molecule; said urethane prepolymer having a ratio of isocyanate groups to hydroxyl groups greater than 1.3:1, and (3) a polyhydric alcohol comprising at least one member selected from the group consisting of a polyalkylene glycol having a molecular weight from about 134 to about 1000, a product derived from the reaction of about 86 to about 96 parts by weight of a castor oil with about 14 to about 4 parts by weight tolylene diisocyanate, a polyether derivative of a polyhydric alcohol having a functionality from about 3 to about 6, an alkylene glycol ester of a hydroxy carboxylic acid having at least twelve carbon atoms, a polyalkylene glycol ester of a hydroxy carboxylic acid having at least twelve carbon atoms and a polyhydric alcohol ester of a hydroxy carboxylic acid of at least twelve carbon atoms, said alcohol having at least three hydroxyls per molecule; and wherein the said vinyl chloride-vinyl acetate copolymer is present in said composition in an amount from about 0.8 to about 4.0 parts by weight for each part by weight of said urethane prepolymer, said polyhydric alcohol being present in said composition in an amount from about 0.2 to about 3.5 parts by weight for each part by weight of said urethane prepolymer and wherein the NCO/OH ratio in the total composition is between about 0.25 and about 0.70:1.

2. A composition according to claim 1 wherein the polyfunctional compound reacted with the diisocyanate is a castor oil.

3. A composition according to claim 1 wherein the partially hydrolyzed vinyl chloride-vinyl acetate copolymer comprises in percent by weight from about 70 to about 96.5 percent vinyl chloride, from about 2 to about 20 percent vinyl alcohol, and from about 1.5 to about 25 percent vinyl acetate.

4. A composition according to claim 3 wherein said partially hydrolyzed vinyl chloride-vinyl acetate copolymer contains by weight about 91 percent vinyl chloride, about 3 percent vinyl acetate and about 6 percent vinyl alcohol.

5. A composition according to claim 1 wherein said polyhydric alcohol is a polyalkylene glycol.

6. A composition according to claim 5 wherein said polyalkylene glycol is a polypropylene glycol.

7. A composition according to claim 1, wherein the polyhydric alcohol comprises a polyalkylene glycol and the product derived from the reaction of about 86 to 96 parts by weight of a castor oil with about 4 to about 14 parts by weight tolylene diisocyanate.

8. A composition according to claim 1 wherein the polyhydric alcohol comprises a polyalkylene glycol and an alkylene glyco monoester of a hydroxy carboxyic acid of at least twelve carbon atoms.

9. A composition according to claim 5 wherein the polyalkylene glycol comprises dipropylene glycol.

10. A composition according to claim 8 wherein the alkylene glycolmonoester of a hydroxy carboxylic acid is propylene glycol monoricinoleate.

11. A composition which consists essentially of (1) a partially hydrolyzed vinyl chloride-vinyl acetate copolymer wherein said copolymer contains by weight from about 70 to 96.5 percent vinyl chloride, from about 2 to about 20 percent vinyl alcohol and from about 1.5 to about 25 percent vinyl acetate, (2) a urethane prepolymer composition obtained by reacting about 30 to about 45 parts by weight of a tolylene diisocyanate and about 70 to about 55 parts by weight of a castor oil, said prepolymer having an NCO/OH ratio of greater than 1.3:1 and (3) at least one polyhydric alcohol selected from the group consisting of a polyalkylene glycol having a molecular weight between 134 and 1000, a product derived from the reaction of about 86 to about 96 parts by weight castor oil with about 14 to about 4 parts by weight of a tolylene diisocyanate, castor oil, propylene glycol monoricinoleate, ethylene glycol monoricinoleate, glycol monoricinoleate and pentaerythritol monoricinoleate; and wherein said vinyl chloride-vinyl acetate copolymer is present in said composition in an amount from about 0.8 to about 4.0 parts by weight for each part by weight urethane prepolymer and said polyhydric alcohol is present in said composition in an amount from about 0.2 to about 3.5 parts by weight for each part by weight of said urethane prepolymer and wherein the NCO/OH ratio in the total composition is between about 0.25:1 and about 0.7:1.

12. A wood substrate coated with a composition which consists essentially of (1) a partially hydrolyzed vinyl chloride-vinyl acetate copolymer, (2) a urethane prepolymer obtained from the reaction of about 30 to about 45 parts by weight of at least one diisocyanate with about 70 to about 55 parts by weight of a polyfunctional compound selected from the class consisting of a castor oil, a glycol ester of ricinoleic acid, a polyglycol ester of ricinoleic acid, and a polyhydric alcohol ester of ricinoleic acid, said alcohol having at least three hydroxyl groups per molecule and said urethane prepolymer having a ratio of isocyanate groups to hydroxyl groups greater than 1.3:1, and (3) a polyhydric alcohol comprising at least one member selected from the group consisting of a polyalkylene glycol having a molecular weight from about 134 to about 1000, a product derived from the reaction of about 86 to about 96 parts by weight of a castor oil with about 14 to about 4 parts by weight tolylene diisocyanate, a polyether derivative of a polyhydric alcohol having a functionality from about 3 to about 6, an alkylene glycol ester of a hydroxy carboxylic acid having at least twelve carbon atoms, a polyalkylene glycol ester of a hydroxy carboxylic acid having at least twelve carbon atoms and a polyhydric alcohol ester of a hydroxy carboxylic acid of at least twelve carbon atoms, said alcohol having at least three hydroxyls per molecule; and wherein said vinyl chloride-vinyl acetate copolymer is present in said composition in an amount from about 0.8 to about 4.0 parts by weight for each part by weight of said urethane prepolymer and said polyhydric alcohol is present in said composition in an amount from about 0.2 to about 3.5 parts by weight for each part by weight of said urethane prepolymer and wherein the NCO/OH ratio in the total composition is between about 0.25:1 and about 0.70:1.

13. A wood substrate coated with a composition according to claim 12 wherein the polyfunctional compound reacted with the diisocyanate is a castor oil.

14. A wood substrate coated with a composition according to claim 12 wherein the partially hydrolyzed vinyl chloride-vinyl acetate copolymer comprises from about 70 to about 96.5 percent by weight vinyl chloride, from about 2 to about 30 percent by weight vinyl alcohol, and from about 1.5 to about 25 percent by weight vinyl acetate.

15. A wood substrate coated with a composition according to claim 12 wherein said polyhydric alcohol is a polyalkylene glycol.

16. A wood substrate coated with a composition according to claim 15 wherein said polyalkylene glycol is a polypropylene glycol.

17. A wood substrate with a composition according to claim 12 wherein the polyhydric alcohol comprises a polyalkylene glycol and the product derived from the reaction of about 86 to 96 parts by weight castor oil with about 4 to about 14 parts by weight tolylene diisocyanate.

18. A wood substrate coated with a composition according to claim 12 wherein the polyhydric alcohol comprises a polyalkylene glycol and an alkylene glycol monoester of a hydroxy acid of at least twelve carbon atoms.

19. A wood substrate coated with a composition according to claim 15 wherein the polyalkylene glycol comprises diisopropylene glycol.

20. A wood substrate coated with a composition according to claim 18 wherein the alkylene glycol monoester of a hydroxy carboxylic acid is propylene glycol monoricinoleate.

21. A wood substrate coated with a composition which contains about 70 to about 96.5 percent by weight vinyl chloride-vinyl acetate copolymer wherein said copolymer contains about 70 to about 96.5 per cent by weight vinyl chloride, about 2 to about 20 percent by weight vinyl alcohol and about 1.5 to about 25 percent by weight vinyl acetate, (2) a urethane prepolymer composition obtained by reaction of about 30 to about 45 parts by weight of a tolylene diisocyanate and about 70 to about 55 parts by weight of a castor oil, said prepolymer having an NCO/OH ratio of greater than 1.3:1 and (3) at least one polyhydric alcohol selected from the class consisting of a polyalkylene glycol having a molecular weight between 134 and 1000, a product derived from the reaction of about 86 to about 96 parts by weight caster oil with about 14 to about 4 parts by weight of a tolylene diisocyanate, castor oil, propylene glycol monoricinoleate, ethylene glycol monoricinoleate, glycerol monoricinoleate and pentaerythritol monoricinoleate; and wherein said vinyl chloride-vinyl acetate copolymer is present in said composition in an amount from about 0.8 to about 4.0 parts by weight for each part by weight urethane prepolymer and said polyhydric alcohol is present in said composition in an amount from about 0.2 to about 3.5 parts by weight for each part by weight of said urethane prepolymer and wherein the NCO/OH ratio in the total composition is 0.25:1 and about 0.70:1.

References Cited

UNITED STATES PATENTS

| 2,512,726 | 6/1950 | Penn et al. | 260—19 |
| 3,149,995 | 9/1964 | Bauer | 260—859 |
| 3,362,921 | 1/1968 | Ehrlich et al. | 260—18 |

OTHER REFERENCES

Saunders et al., "Polyurethanes: Chemistry and Technology," p. 536 of Part II (1964).

DONALD E. CZAJA, Primary Examiner

D. J. BARRACK, Assistant Examiner

U.S. Cl. X.R.

117—148, 161; 260—33.6, 41, 77.5, 859

PO-1050
(5/69)

UNITED STATES PATENT OFFICE
CERTIFICATE OF CORRECTION

Patent No. 3,513,118              Dated       May 19, 1970.

Inventor(s)     Norris R. Legue and Arthur Ehrlich

It is certified that error appears in the above-identified patent and that said Letters Patent are hereby corrected as shown below:

Col. 6, line 3, for "28.9" read -- 38.9 --
Col. 10, line 6 (claim 8) for "glyco" read --glycol--
Col. 10, line 30, (claim 11) for "glycol" read --glycerol--
Col. 11, line 26, (claim 18) after "hydroxy" insert --carboxylic-
Col. 11, line 29, (claim 19) for "diisopropylene" read
--dipropylene--
Col. 11, line 34 (claim 21) delete "contains about 70 to 96.5 per cent by weight" and insert -- consists essentially of (1) a partially hydrolyzed --.

SIGNED AND
SEALED
MAR 9 1971

(SEAL)
Attest:

Edward M. Fletcher, Jr.
Attesting Officer

WILLIAM E. SCHUYLER, JR.
Commissioner of Patents